(12) United States Patent
Brattberg

(10) Patent No.: US 7,778,757 B2
(45) Date of Patent: Aug. 17, 2010

(54) METHOD AND A DEVICE FOR CONTROLLING MOVEMENTS OF A WORK VEHICLE

(75) Inventor: Bjorn Brattberg, Torshalla (SE)

(73) Assignee: Volvo Construction Equipment AB (SE)

( * ) Notice: Subject to any disclaimer, the term of this patent is extended or adjusted under 35 U.S.C. 154(b) by 0 days.

(21) Appl. No.: 11/627,953

(22) Filed: Jan. 27, 2007

(65) Prior Publication Data
US 2007/0150151 A1 Jun. 28, 2007

Related U.S. Application Data

(63) Continuation of application No. PCT/SE2004/001151, filed on Jul. 27, 2004.

(51) Int. Cl.
*G06F 19/00* (2006.01)
(52) U.S. Cl. .............................. 701/51; 701/50; 477/97; 477/900; 172/2; 172/3; 172/10; 37/414; 37/902
(58) Field of Classification Search .................. 701/51, 701/50; 477/97, 900; 172/2, 3, 10; 37/414, 37/902
See application file for complete search history.

(56) References Cited

U.S. PATENT DOCUMENTS

| | | | |
|---|---|---|---|
| 3,749,269 A | 7/1973 | Conrad | |
| 4,800,660 A | 1/1989 | Masao | |
| 5,116,187 A | 5/1992 | Fukuda et al. | |
| 5,184,932 A * | 2/1993 | Misuda et al. | 414/685 |
| 5,462,125 A * | 10/1995 | Stratton et al. | 172/826 |
| 5,511,922 A * | 4/1996 | Sekiguchi et al. | 414/139.6 |
| 5,638,677 A * | 6/1997 | Hosono et al. | 60/431 |
| 5,678,979 A * | 10/1997 | Kovacs | 414/700 |
| 5,774,820 A * | 6/1998 | Linden et al. | 701/93 |
| 6,025,686 A * | 2/2000 | Wickert et al. | 318/568.18 |
| 6,086,509 A * | 7/2000 | Johnson et al. | 477/97 |
| 6,129,158 A * | 10/2000 | Yamamoto et al. | 172/812 |
| 6,173,513 B1 * | 1/2001 | Akimoto | 37/414 |
| 6,487,485 B1 * | 11/2002 | Henneken et al. | 701/56 |
| 6,842,680 B2 * | 1/2005 | Doddek et al. | 701/50 |
| 7,530,185 B2 * | 5/2009 | Trifunovic | 37/348 |
| 7,588,118 B2 * | 9/2009 | Sawada | 180/302 |
| 2001/0032031 A1 * | 10/2001 | Ufheil | 700/169 |
| 2007/0150151 A1 * | 6/2007 | Brattberg | 701/51 |
| 2007/0219693 A1 * | 9/2007 | Stratton et al. | 701/50 |
| 2008/0040006 A1 * | 2/2008 | Sjogren et al. | 701/49 |
| 2008/0072997 A1 * | 3/2008 | Thompson | 144/4.1 |

FOREIGN PATENT DOCUMENTS

| | | |
|---|---|---|
| EP | 0715102 A2 | 5/1996 |
| WO | 03089723 A1 | 10/2003 |

\* cited by examiner

*Primary Examiner*—Thomas G Black
*Assistant Examiner*—Wae Louie
(74) *Attorney, Agent, or Firm*—Novak Druce + Quigg LLP

(57) ABSTRACT

Method and arrangement for controlling movements of a work vehicle. The positional or geometric state of an equipment assembly for handling objects or material is determined and the control scheme which governs operation of at least one driveline component of the vehicle is varied depending on the determined equipment assembly state.

20 Claims, 6 Drawing Sheets

METHOD AND A DEVICE FOR CONTROLLING MOVEMENTS OF A WORK VEHICLE

CROSS-REFERENCE TO RELATED APPLICATIONS

The present application is a continuation patent application of International Application No. PCT/SE2004/001151 filed 27 Jul. 2004 which was published in English pursuant to Article 21(2) of the Patent Cooperation Treaty; said application is expressly incorporated herein by reference in its entirety.

FIELD

The present invention relates to a method and a device for controlling movements movements of a work vehicle comprising an equipment assembly for handling objects or material.

BACKGROUND

The term work vehicle comprises different types of construction machines, such as a wheel loader, a backhoe loader and an excavator. The invention will be described below in a case in which it is applied in a wheel loader. This is to be regarded only as an example of a preferred application.

The wheel loader can be utilized for a number of different areas of activity, such as lifting and transporting stone and gravel, pallets and logs. For some of these activities, use is made of different implements, such as a bucket, a fork and gripping arms. Besides an implement, the equipment assembly also comprises a load-arm unit and one or more working cylinder(s) for operating/moving the implement in question.

When the wheel loader is used for loading material on a loading vehicle such as a dumper or a truck, the implement carrying the material is raised to a high vertical position and the wheel loader is brought nearer to the loading vehicle. Due to the large weight of the material, the movement of the wheel loader is sensitive, which requires great driver skills, and often leads to jerks and swings. It is known to use different so-called gear shifting modes according to a specific gear shifting strategy in wheel loaders with an automatic gear box. Shifting to a higher gear takes place at different minimum engine speeds in two different gear shifting modes. Further, shifting to a lower gear takes place at different minimum vehicle speed in two different gear shifting modes. The gear shifting modes are selected manually by a driver by operating a handle, a so-called APS-handle.

Further, it is known, for example from EP 0715102, to control gear shifting modes of an automatic vehicle transmission based on parameter signals representing specific operation conditions, such as road conditions. Especially, the parameter signal represents the inclination of the road, on which the vehicle is moving.

WO 03/89723 relates to a device for controlling a work vehicle. The control device comprises actuation means, which is manually operated by the driver, for selecting different operating states. Such operating states may be defined by specific activities where different implements, like a bucket or pallet forks are used. Said actuation means is coupled to a central unit. The central unit is coupled to the hydraulic system for moving the implement and the movement of the implement is controlled depending on the selected operating state. The central unit is also coupled to the engine and/or the transmission for controlling the speed of the engine and/or selecting a gear point for the transmission depending on the selected operating state, The control device also comprises means for detection of the position of the implement. The detection means is also coupled to the central unit and the speed of movement of the implement may be limited depending on the detected position of the implement.

SUMMARY

One object of the invention is to achieve a method for controlling the movements of a work vehicle, which creates softer movements and a more simple operation, especially during loading. This object is achieved in that a geometric or positional state of said equipment assembly is determined and that at least one operating parameter of a driveline of the vehicle is controlled depending on the determined equipment assembly state. Preferably, the position of the equipment assembly is determined. By determining the vertical position of the equipment assembly and for a high vertical position changing gears in the gear box so that the driver can depress a gas pedal more for a certain vehicle speed/movement, the movements of the work vehicle may be softened and the operation of the vehicle facilitated and made more efficient.

According to one embodiment, the position of the equipment assembly is determined by a lift angle and/or a tilt angle of an implement in the equipment assembly. This may be achieved by sensing the extension of a hydraulic lift and/or tilt cylinder in the equipment assembly and/or by sensing the angular relationship in an articulation point in a load-arm unit.

According to another embodiment, at least two different equipment assembly position regions are predefined. By dividing the movement pattern of the implement in different regions, the operating parameter of the driveline may be controlled accurately. Especially, at least two different equipment assembly position regions are predefined for each of the lift angle and the tilt angle of the implement. Specific combinations of a lift angle region and a tilt angle region may therefore be used for controlling the operating parameter of the driveline.

Another object of the invention is to achieve a device for controlling the movements of a work vehicle, which creates softer movements and a more simple operation, especially during loading. This object is achieved in that the device comprises means for determining a geometric or positional state of said equipment assembly and a control unit for controlling at least one operating parameter of the driveline depending on the determined equipment assembly state.

Additional embodiments of the invention will be described in the following specification and the accompanying illustrative drawings.

BRIEF DESCRIPTION OF THE DRAWINGS

The invention sill be explained below, with reference to the embodiments shown in the accompanying drawings, wherein.

DETAILED DESCRIPTION

Figure 1:
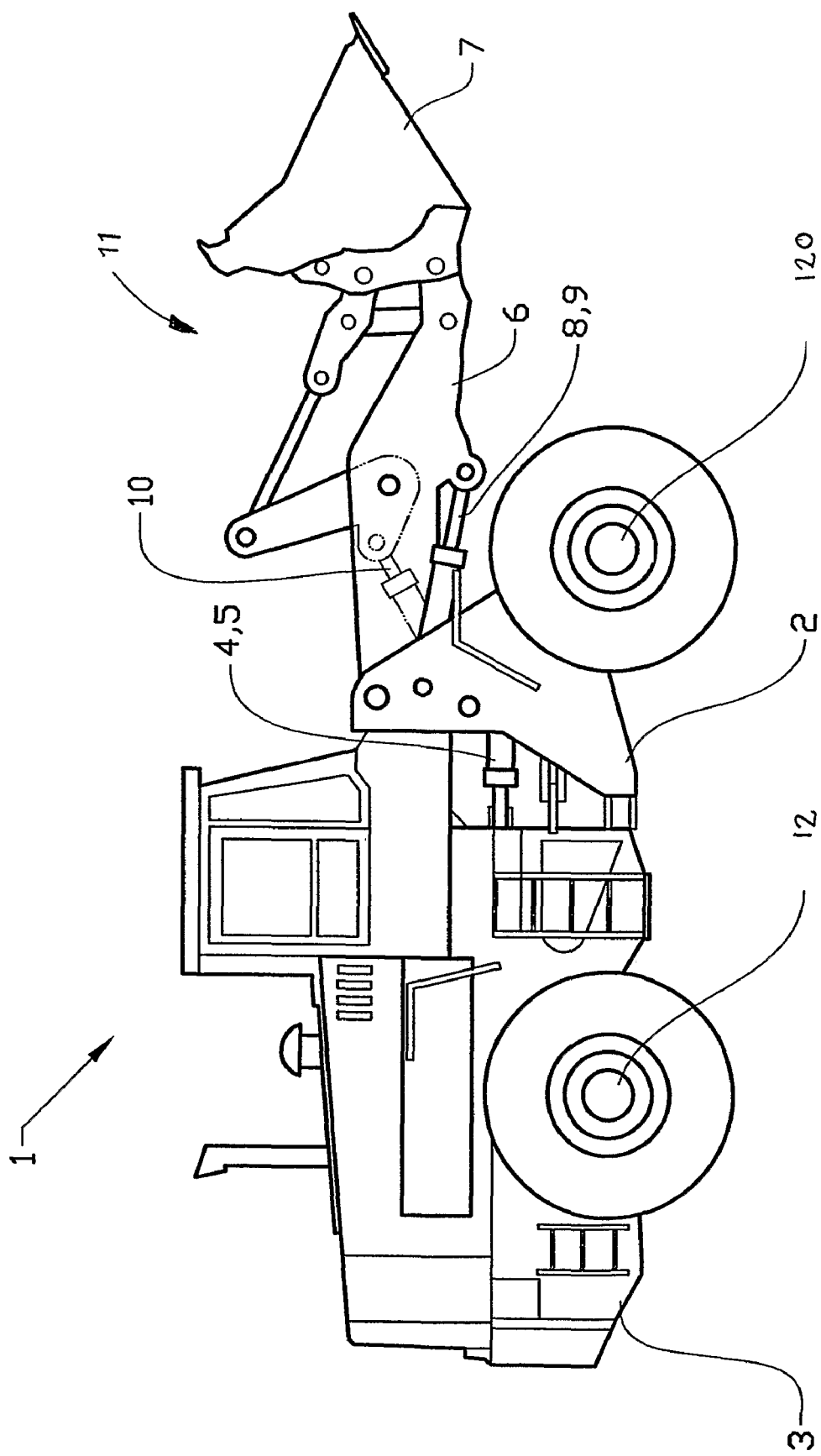
FIG. 1 shows a wheel loader in a side view.

FIG. 1 shows a wheel loader 1. The body of the wheel loader 1 comprises a front body section 2 and a rear body section 3, which sections each has a pair of half shafts 12,120. The body sections are connected to each other in such a way that they can pivot. The body sections 2,3 can pivot in relation to each other around an axis by means of two first hydraulic components in the form of hydraulic cylinders 4,5 arranged between the two sections. The hydraulic cylinders 4,5 are thus arranged to turn the wheel loader 1.

The wheel loader 1 comprises an equipment assembly 11 for handling objects or material. The equipment assembly 11 comprises a load-arm unit 6 and an implement 7 in the form of a bucket fitted on the load-arm unit. The load-arm unit 6 can be raised and lowered relative to the front section 2 of the vehicle by means of two second hydraulic components in the form of two hydraulic cylinders 8,9, each of which is connected at one end to the front vehicle section 2 and at the other end to the load-arm unit 6. The bucket 7 can be tilted relative to the load-arm unit 6 by means of a third hydraulic component in the form of a hydraulic cylinder 10, which is connected at one end to the front vehicle section 2 and at the other end to the bucket 7 via a link-arm system.

Figure 2:
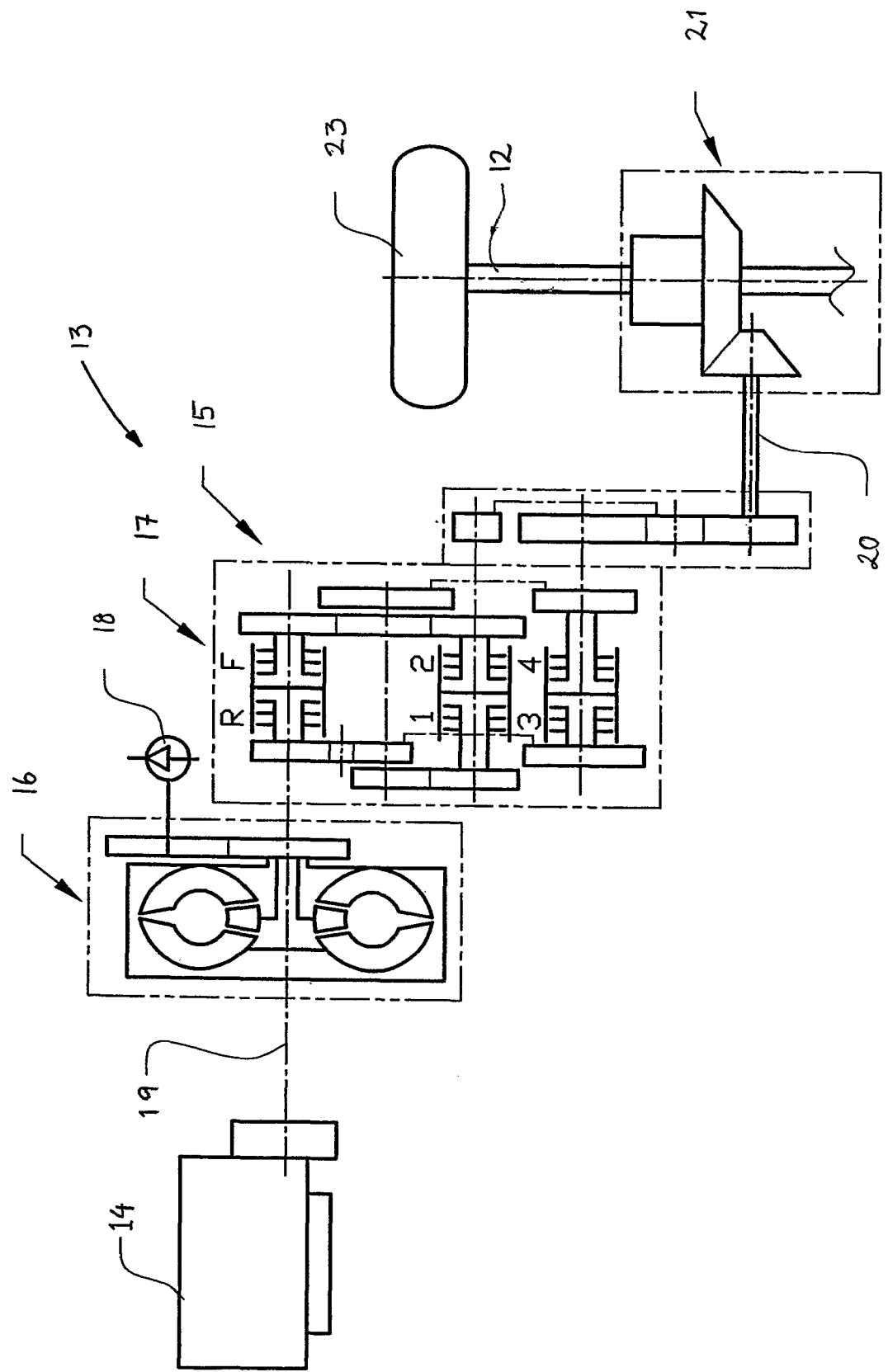
FIG. 2 schematically shows an exemplary embodiment of a driveline for the wheel loader.

FIG. 2 illustrates schematically an example of the wheel loader's 1 driveline 13. The driveline 13 comprises a combustion engine 14, in the form of a diesel engine, an automatic gearbox 15 and a hydrodynamic torque converter 16. The gearbox 15 consists of an electrically controlled automatic gearbox of the power-shift type. The gearbox 15 comprises a forward and reverse gear 17.

FIG. 2 also shows a pump 18 in the wheel loader's hydraulic system for supplying the hydraulic cylinders 4,5,8,9,10 with hydraulic fluid. The pump 18 (like the torque converter 16) is driven by an output shaft 19 from the engine 14. An output shaft 20 from the gearbox 15 leads to a differential gear 21, which is drivingly connected to said half-shafts 12, on which the vehicle's driving wheels 23 are arranged.

Figure 3:
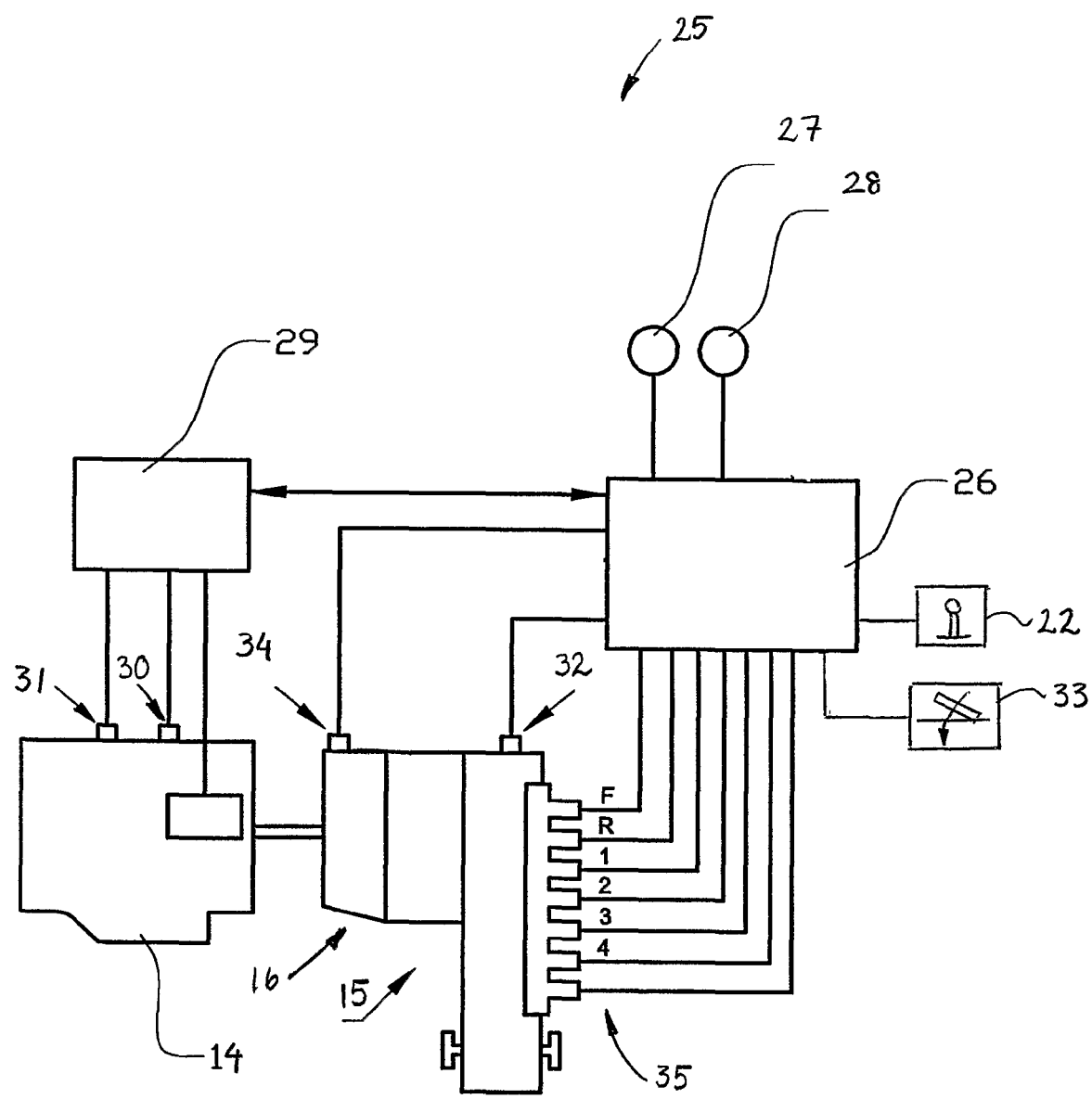
FIG. 3 schematically shows a control device for controlling movements of the wheel loader.

FIG. 3 shows a device 25 for controlling movements of the wheel loader 1. The control device 25 comprises a first control unit 26 (or ECU, Electrical Control Unit) with software for controlling movements of the wheel loader. The control device 25 comprises means 27, 28 for determining a state of said equipment assembly 11 for handling objects or material. Said means 27,28 are electrically connected to the control unit 26 and produce equipment assembly state signals to the control unit 26.

More specifically, said means 27,28 are arranged for determining a position of the equipment assembly 11 and are preferably formed by sensors. Said means 27,28 are arranged for detection of the position of the equipment assembly in a vertical direction. Said sensors 27,28 are arranged for sensing the lift angle and the tilt angle, respectively, of the implement 7. The lift angle is defined in a vertical direction and determined by the extent of projection of the second hydraulic cylinders 8,9. The tilt angle is determined by the extent of projection of the third hydraulic cylinder 10. Said sensors 27,28 are formed by angular sensors for sensing the angular position at an articulation point. Each of said sensors 27,28 may alternatively be formed by linear sensors, sensing the extent of projection of the hydraulic cylinder in question.

The control device 25 comprises a second control unit 29 (see FIG. 3) for controlling the speed of the engine 14, via control means 31. The second control unit 29 is functionally (electrically) connected to the first control unit 26 and obtains information from this concerning the desired engine speed. This desired engine speed is in turn controlled by the degree of depression of a gas pedal 33. A sensor detecting the depression of the gas pedal is coupled to the first control unit 26. The engine speed is thus increased with increased depression of the gas pedal.

The engine speed is detected via an engine speed sensor 30. The sensor 30 is electrically connected to the first control unit 26.

The vehicle's speed is detected by a sensor 32 in a conventional way, for example by measurement of the speed of rotation of a shaft inside the gearbox 15.

The control device 25 comprises means 34 for controlling the torque converter 16. The torque converter control means 34 is electrically connected to the control unit 26 and is controlled by it. The torque converter control means 34 is here arranged for controlling lock-up of the torque converter 16.

The control device 25 comprises a plurality of means 35 for controlling transmission shifting points in the gearbox 15. Said transmission control means 35 are electrically connected to the control unit 26 and are controlled by the same.

The control device 25 is arranged to shift gears according to a plurality of different predefined gear shifting modes (i.e., one species of control scheme), each of which governs when the gears are shifted. Shifting to a higher gear takes place at different minimum engine speeds in two different gear shifting modes. Further, shifting to a lower gear takes place at different minimum vehicle speed in two different gear shifting modes. One parameter based on which the particular gear shifting mode is selected is the above-mentioned determined equipment assembly state. There may also be other parameters that influence the selection of gear shifting mode.

Further, a plurality of operating levers 22 are arranged in the wheel loader cab for being maneuvered by the driver and electrically connected to the control unit 26 for controlling movements of the wheel loader 1 (and the equipment assembly 11). The signals from the operating levers 22 are converted in a characteristic way in the control unit 26 depending on the position signals from the position sensors 27,28 and are then sent as output signals to the respective driveline component in question.

The inventive method for controlling the movements of the wheel loader will below be described according to a first embodiment in connection with FIG. 4 and 5. The wheel loader 1 is in FIG. 5 equipped with a bucket 7.

Figure 4:
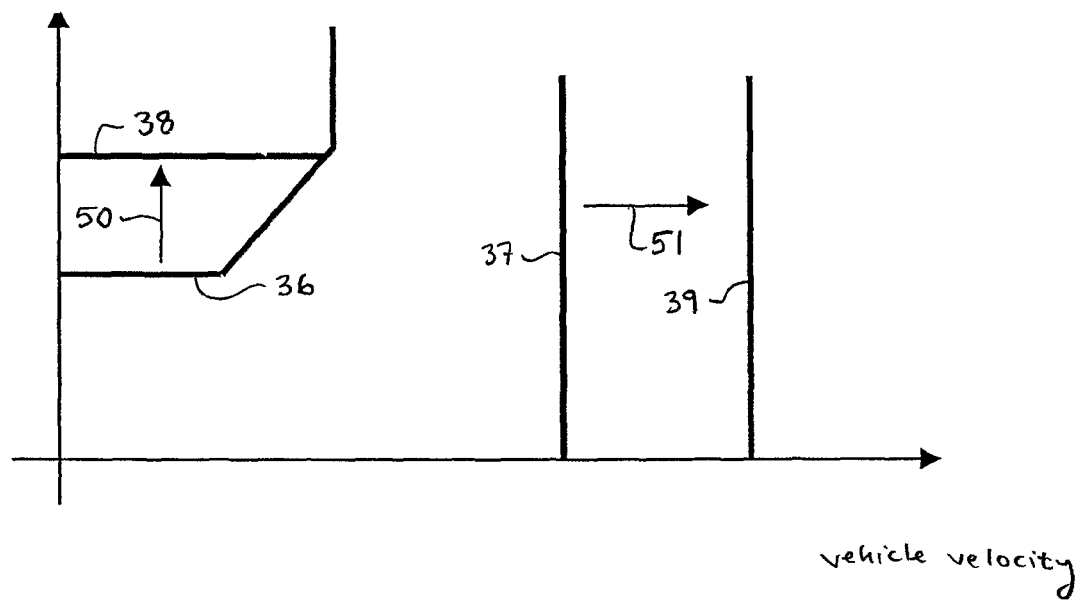
FIG. 4 shows a diagram where different transmission gear points are exemplified.

In FIG. 4, two examples of gear shifting modes are shown for shifting between the first and second gear. Vehicle velocity is defined on the x-axis and engine speed is defined on the y-axis.

A state of the equipment assembly 11 is defined by the lift angle and the tilt angle. More specifically, three position regions are defined for the lift angle, $\alpha$; "Bucket down":$\alpha<-30°$, "Bucket inbetween":$-30°<\alpha<30°$ and "Bucket raised": $\alpha>30°$. Three position regions are also defined for the tilt angle, $\beta$; "Bucket forwards":$\beta<-30°$; "Bucket neutral":$-30°<\beta<30°$ and "Bucket backwards":$\beta>30°$. These three position regions for the lift angle and the tilt angle, respectively, give 3*3=9 equipment assembly states.

Each of the nine equipment assembly states has a specific gear shifting mode associated with it. Each gear shifting mode comprises predefined transmission shifting points adapted for an optimum operation. Below follows two examples of gear shifting modes.

A first curve 36, or line, in the diagram, defines the engine speed limit for shifting from gear number two to gear number one in a first gear shifting mode. The gear shifting line is different for different gear shifting modes, as indicated by an arrow 50. A second curve 38, or line, in the diagram defines the engine speed limit for shifting from gear number two to gear number one in a second gear shifting mode. The first and second curve 36,38 are here defined by straight lines at different engine speeds.

A third curve 37, or line, in the diagram, defines the vehicle velocity limit for engaging lock-up in the torque converter 16 according to a first lock-up mode (i.e., another species of control scheme), and a fourth curve 39, or line, in the diagram defines the vehicle velocity limit for engaging lock-up in the torque converter 16 in a second lock-up mode. The torque converter lock-up line is different for different lock-up modes, as indicated by arrow 51. The third and fourth curves 37,39 are here defined by straight lines at different vehicle velocities. A vehicle state is below defined by the parameters engine speed and vehicle velocity.

As a first example, the detected equipment assembly state is: lift angle; "Bucket down", and tilt angle; "Bucket neutral". This equipment assembly state has associated with it the first gear shifting mode curve 36 in the diagram (defining the engine speed limit for shifting from gear number two to gear number one). Further, this equipment assembly state also has associated with it the third curve 37 in the diagram (defining the vehicle velocity limit for engaging lock-up in the torque converter 16).

As a second example, the detected equipment assembly state is: lift angle; "Bucket raised", and tilt angle; "Bucket forwards". For this equipment assembly state, shifting down to gear number one is prohibited and lock-up in the converter is also prohibited (i.e., a different torque lock-up control scheme).

As a third example, the detected equipment assembly state is: lift angle; "Bucket down", and tilt angle; "Bucket backwards". This equipment assembly state has associated with it the second curve 38 in the diagram (defining the gear shifting mode, i.e., engine speed limit for shifting from gear number two to gear number one), which represents yet another gear shifting control scheme. Further, this equipment assembly state has associated with it the fourth curve 39 in the diagram (defining the vehicle velocity limit for engaging lock-up in the converter 16), which represents yet another torque lock-up control scheme.

As an alternative to the bucket, the above-described method is also applicable when the wheel loader is equipped with pallet forks.

The above-described method may also be used for equipment assembly with more degrees of freedom.

Figure 5:
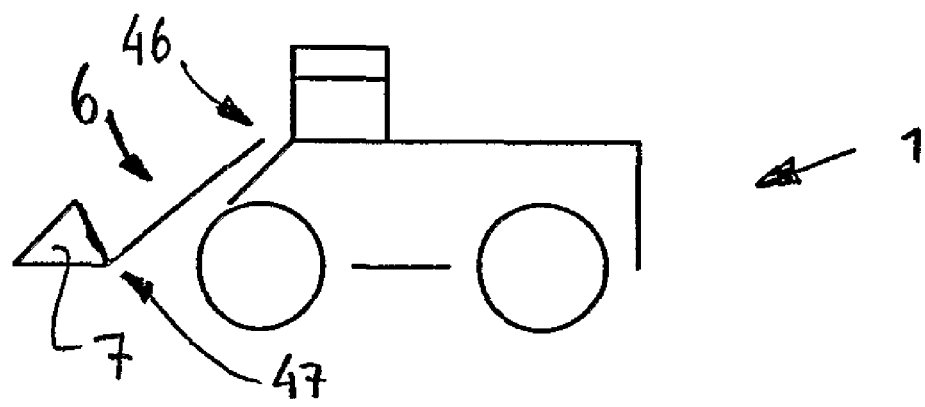
FIG. 5-7 schematically shows a wheel loader in three different cases, in which different equipment assembly is applied.

FIG. 5 is a schematic drawing of the wheel loader shown in FIG. 1. The lift angle is indicated with reference numeral 46 at the position where the load-arm unit 6 is connected to the vehicle body. The tilt angle is indicated with reference numeral 47 at the position where the bucket 7 is connected to the load-arm unit 6.

Figure 6:
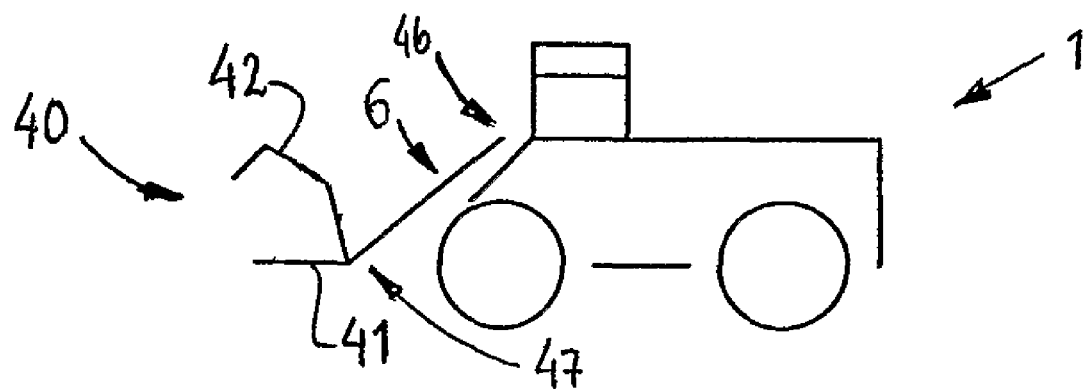

In FIG. 6, a wheel loader 1 is equipped with a timber enclosing fork 40. The lift angle is indicated with reference numeral 46 at the position where the load-arm unit 6 is connected to the vehicle body. The tilt angle is indicated with reference numeral 47 at the position where the fork 40 is connected to the load-arm unit 6. Such type of fork 40 comprises two arms 41,42, which are movable in relation to each other via an articulation joint 47 for enclosing elongated pieces, like timber, between each other. Said equipment assembly state may in this case not only be defined by said plurality of equipment assembly position regions for the lift angle and tilt angle, but in addition be defined by a plurality of equipment assembly position regions for the relative positions of said two forks 41,42.

Figure 7:
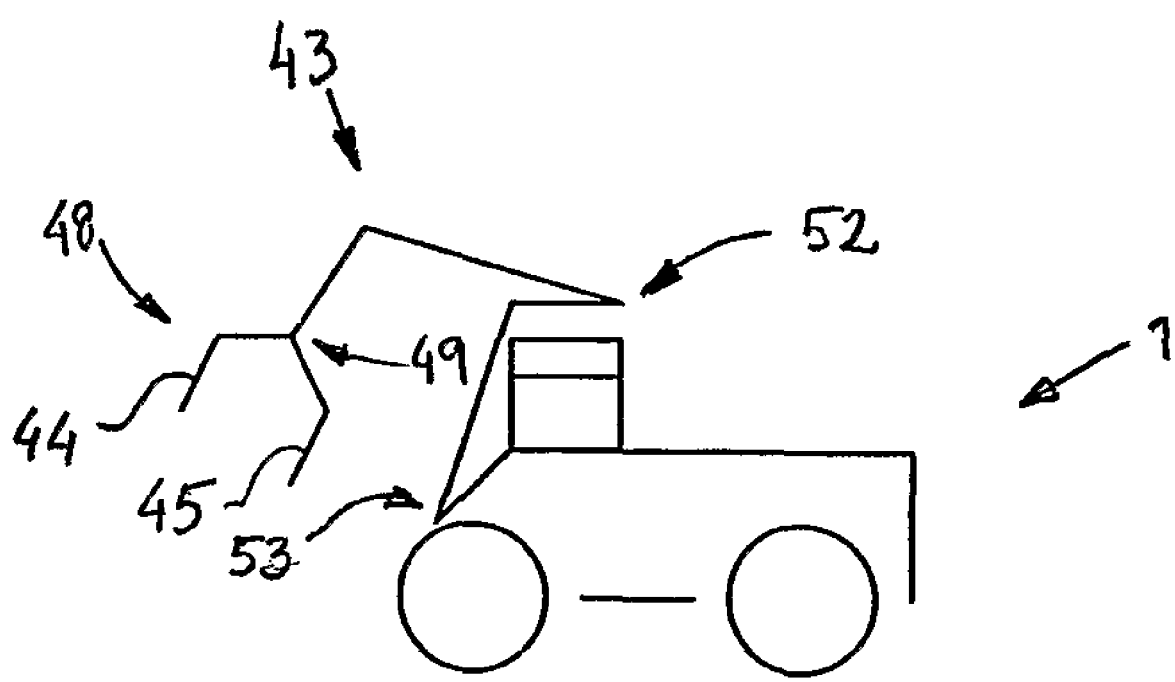

In FIG. 7, a wheel loader 1 is equipped with a specific type of load-arm unit; a so-called high lift 43 for timber. The tilt angle is indicated with reference numeral 53 at the position where the load-arm unit 43 is connected to the vehicle body. The lift angle is indicated with reference numeral 52 at an articulation point between two arms in the load-arm unit 6. Like in the embodiment of FIG. 6, the load-arm unit 43 comprises a fork 48. The fork 48 comprises two arms 44,45, which are movable in relation to each other via an articulation joint 49 for enclosing elongated pieces, like timber, between each other. Further, the fork 48 is rotatably arranged in the load-arm unit at its point of connection to the load-arm unit 43. Said equipment assembly state may in this case not only be defined by said plurality of equipment assembly position regions for the lift angle, tilt angle, and relative position of the two forks 44,45, but in addition be defined by a plurality of equipment assembly position regions for the rotation angle.

The invention is also directed to a computer program comprising code means for performing all the method steps described above when said program is run on a computer. Said computer program is loaded in a memory in the control unit. Said computer program may be sent to the control unit by wireless technique, for example via the internet.

The invention is further directed to a computer program product comprising program code means stored on a computer readable medium for performing the method described above when said program product is run on a computer. Said computer readable medium may be in the form of a floppy disk or a CD-ROM.

The abovementioned control unit (ECU) 26 is also often called a CPU (Control Power Unit) or plainly vehicle computer.

The invention is not in any way limited to the above described embodiments, instead a number of alternatives and modifications are possible without departing from the scope of the following claims.

For example, the gearbox design shown in FIG. 2 is only to be regarded as an example of a gearbox that can be used for carrying out the movement method.

Further, said gear mode may comprise controlling the speed of the engine.

In addition, the two control units 26,29 can be integrated into a single control unit.

As an alternative, or complement, to controlling transmission shifting points and lock-up in the converter, said control unit may be arranged to set a torque curve in the engine.

As an alternative, or complement, to the vertical position, said equipment assembly state may comprise the speed of movement of the equipment assembly.

The invention may also be applied for a fork-lift truck for handling pallets in an industry.

What is claimed is:

1. A method for controlling movement of a work vehicle (1) that includes an equipment assembly (11) for handling objects or material and a driveline, said method comprising:
   automatically determining the geometric or positional state of the equipment assembly (11);
   automatically selecting a control scheme from among a plurality of different predefined control schemes that can be used to govern operation of a component of the vehicle's driveline (13), the selected control scheme being selected based upon the determined geometric or positional state of the equipment assembly; and
   controlling operation of said driveline component in accordance with the selected control scheme.

2. The method as recited in claim 1, wherein the geometric or positional state of the equipment assembly (11) is determined based on a known lift angle and a tilt angle of an implement (7) of the equipment assembly (11).

3. The method as recited in claim 2, wherein:
at least two different equipment assembly geometric or positional regions are predefined, each of which has a different control scheme associated with it.

4. The method as recited in claim 3, wherein the at least two different equipment assembly geometric or positional regions are predefined for each of the lift angle and the tilt angle of the implement.

5. The method as recited in claim 4, wherein the selected control scheme is selected based on one implement position region for the lift angle and one implement position region for the tilt angle.

6. The method as recited in claim 1, wherein the driveline component is a transmission gearbox and the different predefined control schemes are gear shifting modes which govern transmission gear shifting points.

7. The method as recited in claim 1, wherein the driveline component is a torque converter (16) and the different predefined control schemes are lock-up modes which govern lock-up in said torque converter (16).

8. The method as recited in claim 1, wherein at least one operating condition of the vehicle is detected and said different predefined control schemes take account of the detected vehicle operating condition.

9. The method as recited in claim 8, wherein engine speed and/or vehicle velocity is/are detected and is/are taken account of by the different predefined control schemes.

10. The method as recited in claim 1, wherein the method is effected utilizing a computer program comprising code means and wherein said computer program is run on a computer.

11. The method as recited in claim 1, wherein the method is effected utilizing a computer program product comprising program code means stored on a computer readable medium and wherein said computer program product is run on a computer.

12. A device for controlling movement of a work vehicle (1) that includes a driveline (13) and an equipment assembly (11) for handling objects or material, said device comprising:
determination means (27,28) for automatically determining the geometric or positional state of the equipment assembly (11); and
a control unit (26,29) that is configured to control operation of a component of the vehicle driveline in accordance with a control scheme that is selected from among a plurality of different predefined control schemes, the selected control scheme being selected automatically based upon the determined geometric or positional state of the equipment assembly.

13. The device as recited in claim 12, wherein the determination means (27,28) is configured to determine a lift angle and a tilt angle of an implement (7) in the equipment assembly (11).

14. The device as recited in claim 12, wherein the control unit (26,29) has stored therein at least two different predefined equipment assembly geometric or positional regions, each of which has a different control scheme associated with it.

15. The device as recited in claim 12, wherein the equipment assembly geometric or positional regions are predefined for each of the lift angle and the tilt angle of the implement.

16. The device as recited in claim 15, wherein the control unit (26,29) is arranged such that the selected control scheme is selected based on one implement position region for the lift angle and one implement position region for the tilt angle.

17. The device as recited in claim 12, wherein the driveline component is a transmission gearbox and the different predefined control schemes are gear shifting modes which govern transmission gear shifting points.

18. The device as recited in claim 12, wherein the driveline component is a torque converter (16) and the different predefined control schemes are lock-up modes which govern lock-up in said torque converter (16).

19. The device as recited in claim 12, wherein the device further comprises means (30,32) for detecting at least one operating condition of the vehicle and said different predefined control schemes take account of the detected vehicle operating condition.

20. The device as recited in claim 19, wherein the detection means (30,32) detect engine speed and/or vehicle velocity.

* * * * *